Feb. 13, 1951  B. I. SMITH  2,541,673
WEAK-ACID ISOPROPANOL PROCESS
Filed Oct. 30, 1947  2 Sheets-Sheet 1
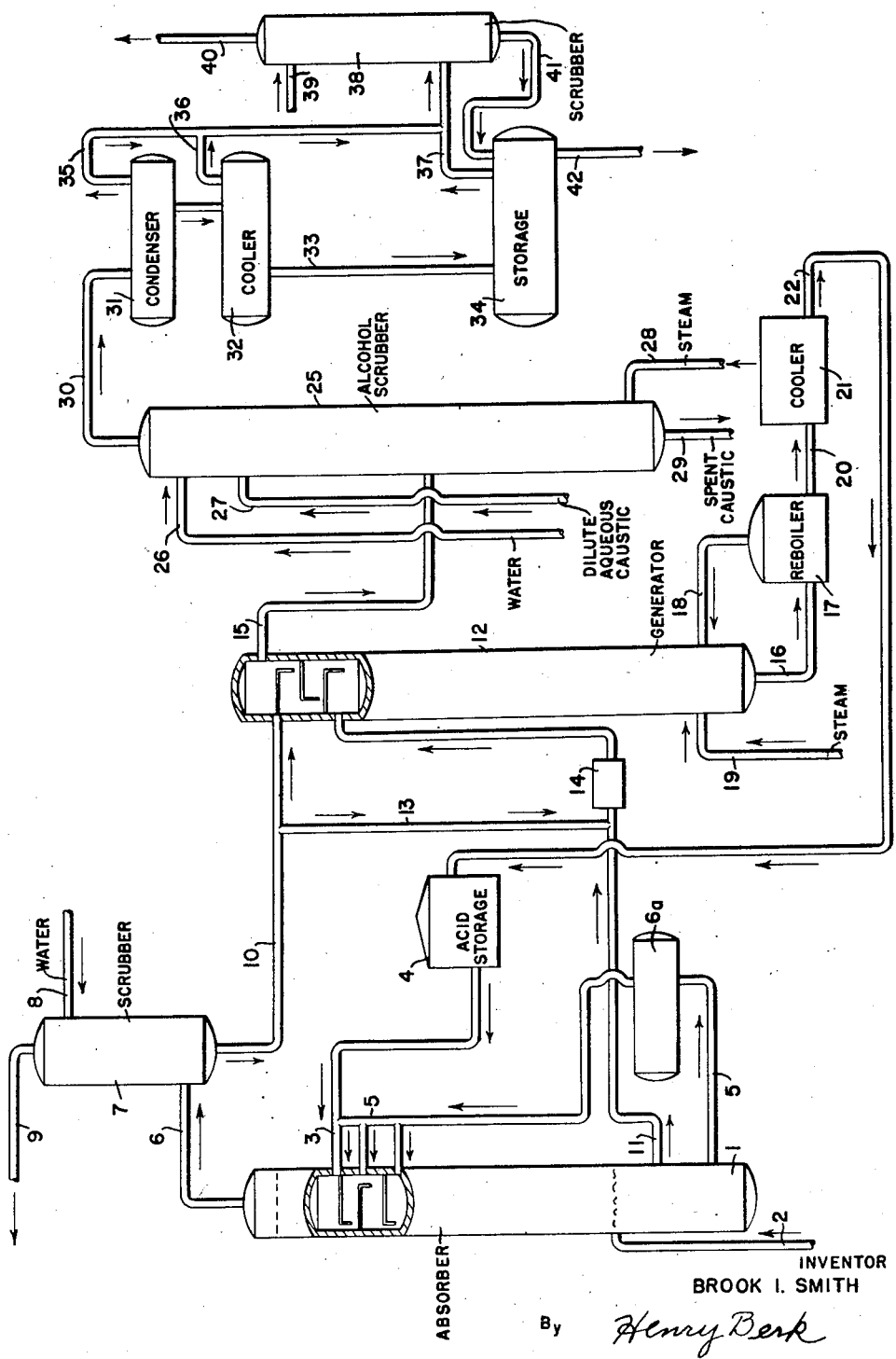
INVENTOR
BROOK I. SMITH
By Henry Berk
ATTORNEY

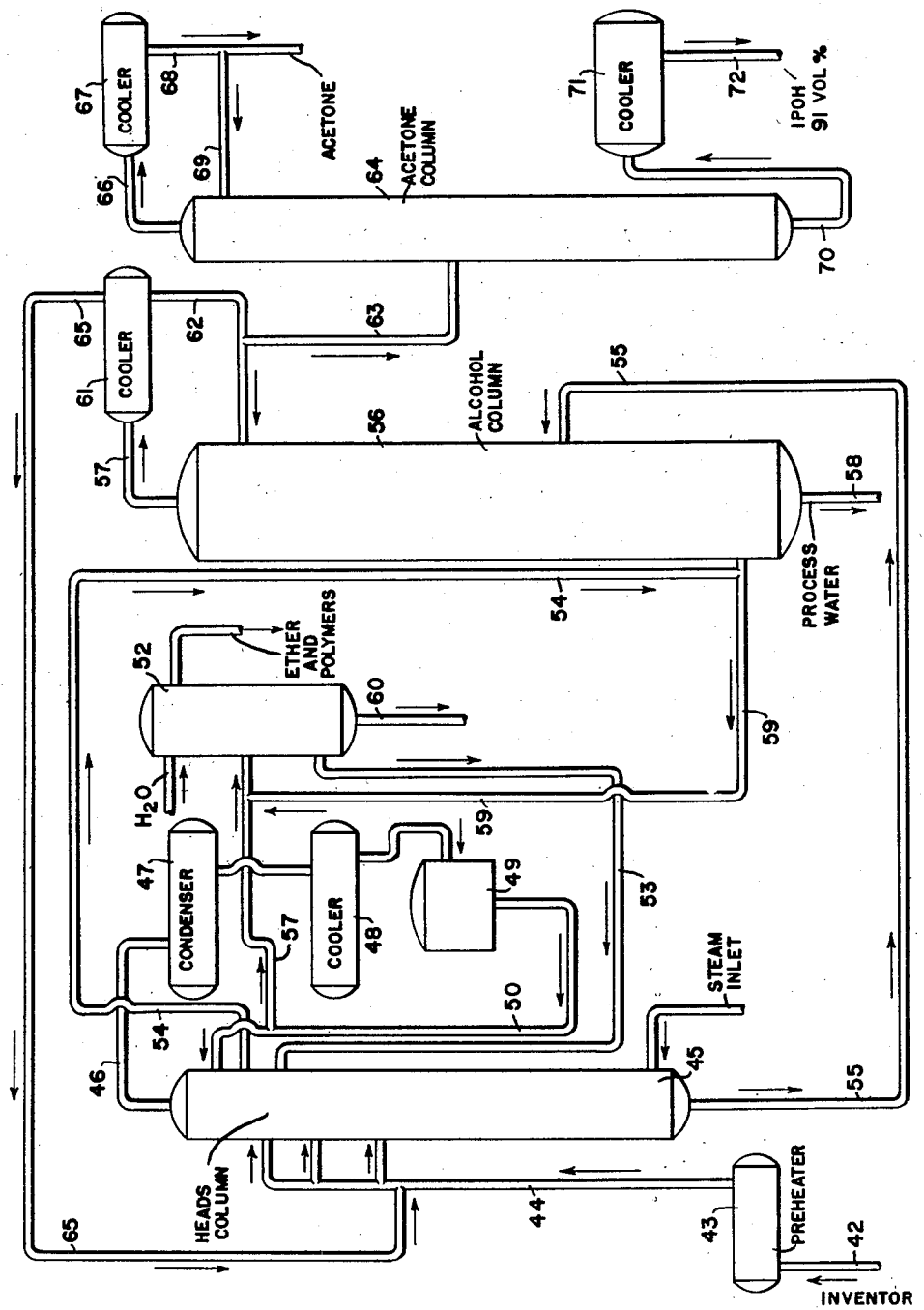

Patented Feb. 13, 1951

2,541,673

UNITED STATES PATENT OFFICE 2,541,673

WEAK-ACID ISOPROPANOL PROCESS

Brook I. Smith, Elizabeth, N. J., assignor to Standard Oil Development Company, a corporation of Delaware Application October 30, 1947, Serial No. 783,111

4 Claims. (Cl. 260—639)

This invention relates to the sulfation of propylene. More particularly, the invention relates to the preparation of isopropyl alcohol by the sulfation of propylene to form isopropyl sulfates and subsequent hydrolysis of the isopropyl sulfates to form isopropyl alcohol.

The propylene to be sulfated may be obtained from any available source such as the destructive distillation of carbonaceous materials but particularly from the cracking of petroleum hydrocarbons such as is presently practiced in the petroleum refining of mineral oils. The propylene employed in this invention may be conveniently obtained by careful fractionation of cracked petroleum gases and is practically free of higher unsaturates, particularly diolefins such as butadiene etc.

It is an object of this invention to promote substantial increase in the yield of isopropyl alcohol as produced by the sulfation of propylene. It is also an object of this invention to promote the absorption of polyene in sulfuric acid thereby increasing the yield of isopropyl sulfates and of isopropyl alcohol therefrom. It is a further object of this invention to minimize the consumption and degradation of sulfuric acid in the sulfation process.

These and other objects of the invention will be apparent from the following description of the invention in conjunction with the accompanying drawings.

Figure 1 represents a diagrammatic sketch of typical apparatus employed in the production of crude isopropyl alcohol by the method of this invention.

Figure 2 represents a similar sketch for the finishing of the crude isopropyl alcohol.

The section of the process represented by Figure 1 is designed to convert propylene to crude isopropyl alcohol and may be broken down into the following essential phases:

1. Absorption of propylene in approximately 70% sulfuric acid at about 170° F. and approximately 250 lbs. per sq. in. gauge pressure to form isopropyl sulfates which in the presence of the 70% acid are partially hydrolyzed to alcohol. The concentration of propylene in the feed stream is a factor which is correlated with the pressure employed in the absorber; for example, with concentrated propylene (75-85 mol percent, a simplified absorber design is used and absorption can be carried out at comparatively low pressure, for example, 200-250 psig.). On the other hand, a more dilute propylene feed (50-55 mol percent) requires a higher absorber pressure and possibly the use of two absorbers for high propylene recovery.

2. Completion of hydrolysis by dilution of the extract leaving the absorber to approximately 45% sulfuric acid (on a hydrocarbon free basis) and maintaining the extract at about 190° F. for a period of about 10 minutes residence time.

3. Distillation of the hydrolysis products (alcohol and ether) from the spent acid and reconcentration of the spent acid to 70% strength.

Referring to Figure 1, propylene-rich gas or liquid which is substantially free of $C_4$ unsaturates, particularly butadiene, is introduced through line 2 into absorber 1 by means of jets to obtain dispersion of the propylene through the reaction mixture. Sulfuric acid of approximately 70% strength is continuously pumped from storage tank 4 via line 3 into the absorber at a point or plurality of points near the top thereof. The absorber is operated at a temperature in the range of 140°-190° F. and a suitable pressure in the range of 100 to 500 p. s. i. g., depending on the concentration of propylene in the feed stream. In the absorber the sulfuric acid reacts with the propylene to form an extract product saturated with 1 to 1.5 mols of propylene per mol of sulfuric acid, preferably about 1.2 mols of propylene per mol of acid. In no case should the acid strength fall below 65% on a hydrocarbon free basis, nor should it be allowed to exceed 85%. The extract product is gravitated continuously to the bottom of the tower and is removed therefrom to the hydrolysis zone as will be further explained. The absorption reaction is exothermic to the extent of approximately 25,000 B. t. u. per mol of propylene absorbed, and this heat is removed by circulation of extract via line 5 through an external cooler 6a and thence back to the top of the absorber at one or more points as indicated. The extract may be added to the acid line 3 as well as to the absorber directly.

This invention contemplates controlling temperature in an absorber or absorbers by recycling extract withdrawn from the absorber or absorbers through an external cooler and returning said cooled extract to the absorber. It is particularly applicable to multistage absorbers in which the amount of heat liberated during the absorption of propylene in sulfuric acid is so large and so concentrated over a few plates in the absorption tower that it is impossible to remove it entirely by internal cooling units. For example, in the operation of a multiplate absorber the propylene feed enters the bottom of the tower and passes countercurrently to sulfuric acid which enters near the top of the tower. Leaving the bottom of the tower is a mixture of isopropyl sulfate, isopropyl alcohol, isopropyl ether and a small amount of free acid. Leaving the top of the tower is a residue gas lean in propylene. The rate of reaction is low in saturated extract and heat liberation therefore is low on the bottom plates of the tower. Going up the tower as the amount of free acid increases, the reaction increases. Progressing down from the top of the tower the propylene driving force is low on the top plate due to the relatively low propylene concentration in the gas, and because of its poor solubility in fresh acid. As extract is formed, the propylene solubility increases. Likewise, the propylene driving force increases going down from the top of the tower. Therefore, it is apparent that a zone is reached toward the middle of the tower where there will be a maximum amount of reaction and consequent maximum amount of heat liberation. According to this feature of the invention, the partially saturated extract is withdrawn from a plate above or below the zone of greatest heat liberation, cooled by external means and returned to one or more plates in the tower as may be necessary to control the temperature at those points. A second function of the extract recycling is to reduce the peak of high heat liberation by withdrawing extract from one plate and injecting it at a different plate in order to increase or decrease the amount of reaction occurring at the second plate or plates.

Sufficient extract is circulated to maintain the temperature of the reaction mixture in the absorber within a range of 140° to 190° F. In one arrangement the jets for the dispersion of the propylene feed through the reaction mixture are arranged in 5 parallel manifolds (not shown) each of which may be closed off individually. The number of jets in use may thus be varied to obtain a desired pressure drop across the jets of from 20 to 40 lbs. per sq. in.

Residue gas leaves the absorber via line 6 and enters a packed scrubber 7, where it is countercurrently water-washed to extract the alcohol and acid content thereof. Water is fed to the scrubber via line 8. The washed residue gas then passes overhead from the scrubber via line 9. It is caustic washed and returned to the refinery for further use. The dilute aqueous mixture of alcohol and acid from the scrubber is removed via line 10 and led to the generator 12 for use in diluting the acid extract to 45% for the completion of hydrolysis. This aqueous mixture also serves to remove entrained acid from the overhead passing through line 15. Alternatively, the dilute aqueous alcohol and acid mixture withdrawn from the scrubber may be withdrawn via line 13 and added to the extract leaving the absorber via line 11. In such a case the mixture passes to mixer 14 where the extract is thoroughly diluted and mixed before passing to the top of the generator or hydrolysis zone 12.

Within the generator 12 the extract is diluted to approximately 45% sulfuric acid on a hydrocarbon-free basis and is maintained at a temperature of approximately 190° F. for a period of about 10 minutes. The generator also serves as a stripping zone whereby the alcohol produced by the hydrolysis is steam-stripped and leaves the generator at a point near the top thereof via line 15. Spent acid of approximately 45% strength is withdrawn at the bottom of the tower via line 16 and led to reboiler 17 for reconcentration to 70% acid which is removed from the reboiler via line 20, cooled in cooler 21 and returned via line 22 to the acid storage tank 4. Vapor from the reboiler is returned to the generator via line 18 and serves as stripping steam. Additional stripping steam, if required, is supplied to the generator via line 19. This procedure effects a considerable economy in steam consumption.

Overhead from the generator, consisting of isopropyl alcohol of approximately 65 volume per cent strength, isopropyl ether and hydrocarbon gases, enters the alcohol scrubber 25 at a point near the mid-section thereof. The overhead vapors are countercurrently scrubbed with water entering the top of the tower through line 26 and with dilute (5 to 10%) aqueous caustic solution likewise entering the top of the tower through line 27. The caustic solution removes traces of acid from the alcohol, and the water which is added on the top trays of the scrubber removes the caustic soda mist. Spent caustic solution in the bottom of the scrubber is steam-stripped to remove the alcohol content thereof by means of steam entering through line 28. Spent caustic is removed from the scrubber via line 29.

Alcohol vapors from the scrubber are removed overhead via line 30, condensed in condenser 31 and cooled in cooler 32. Non-condensable gases from the condenser and cooler are removed via lines 36 and 35 and are water-washed in scrubber 38 supplied by water through line 39. The non-condensable gases are removed through line 40. The cool alcohol is removed from cooler 32 via line 33 to storage drum 34. Vapors from the storage drum are likewise passed via line 37 to scrubber 38. The dilute alcohol-water mixture leaving the bottom of the scrubber by means of pipe 41 is added to the crude aqueous alcohol in the storage drum together with additional water to dilute the crude alcohol to approximately 30 to 50% by volume strength. This alcohol may be allowed to settle for a period of time to permit separation of polymer before being passed to the finishing stage of the process. A rundown tank may be used for this purpose to which the alcohol is led via line 42.

Figure 2 which represents the finishing stage of the alcohol process consists of three general distillation columns. The crude alcohol feed, after preheating, is charged to a heads column in which ether and light hydrocarbons are stripped from the weak alcohol. The weak alcohol bottoms from the heads column enters an alcohol rectifying column in which concentrated isopropyl alcohol in 91% volume strength is taken overhead. The concentrated alcohol is freed of traces of acetone in an acetone column and sent to storage as purified 91% isopropyl alcohol.

Referring now to Figure 2, crude isopropyl alcohol of 30 to 50% volume strength is led via line 42 to preheating zone 43 and thence via line 44 to the heads column 45. The purpose of the heads column or purifying column is to remove ether and other low boiling water-insoluble impurities such as hydrocarbons and hydrocarbon polymers etc. from the weak alcohol. This is accomplished by a steam stripping operation whereby the lighter materials are withdrawn overhead from column 45 through line 46 while the weak aqueous alcohol is withdrawn as bottoms from the heads column for further processing as will be later explained. Ether and hydrocarbon vapors, together with some alcohol and water, are taken overhead through line 46, condensed in condenser 47, cooled in cooler 48 and led to a reflux drum 49. Reflux is supplied to the top of the column from drum 49 via line 50. Part of the reflux is withdrawn through line 51 and carried to vessel 52 where the ether and polymers are water-washed in the liquid phase for recovery of alcohol therefrom, and allowed to separate into two layers. Part of the aqueous alcohol layer is withdrawn and refluxed to the heads column via line 53. The remainder is withdrawn through line 60 and sent to storage for later use in dilution of the crude alcohol before entering the finishing operation. If desired, an ether cut may also be withdrawn as a sidestream from the heads column and mixed with polymer bottoms from the alcohol column 56 being withdrawn through line 59. The ether serves to keep the polymers in solution thereby increasing the ease of handling. The mixture of ether and polymers is added to line 51 where it passes to vessel 52.

Aqueous alcohol free of ether and light hydrocarbon polymers is withdrawn through line 55 and enters the alcohol column for concentration at a point near the bottom section thereof. In the alcohol column the alcohol is concentrated to a composition approaching its azeotrope with water, namely 91 volume per cent isopropyl alcohol, 9% water. Material of this composition is taken overhead through line 57 and cooled in cooler 61. Part of the cooled material is returned to the column as reflux via line 62. The balance of the alcohol is sent via line 63 to the acetone column 64 for removal of acetone. Any uncondensed material contained in the overhead from the alcohol column is returned via line 65 to the heads column for further treatment. In the acetone column, acetone is separated from the isopropyl alcohol, being taken overhead through line 66 and cooled in cooler 67. Acetone purity of approximately 90 volume per cent is led to storage via line 68, a portion being withdrawn and employed as reflux to the column via line 69. Isopropyl alcohol, free of acetone, is removed as bottoms from the acetone column via line 70, is cooled in cooler 71 and led to storage via line 72. The alcohol is ready for sale as 91 volume per cent isopropyl alcohol or may be further treated for the production of 95 volume per cent isopropyl alcohol or higher as desired.

Returning now to the alcohol column 56, during the steam distillation the heavier polymers present in the alcohol will in the presence of water become insoluble and form a layer somewhere near the lower portion of the vessel. In the weak acid process as described, the amount of polymer formed is not very large and in some instances may be only negligible. This layer of polymer material is withdrawn through line 59 and sent to vessel 52. As previously mentioned, the withdrawal of the polymeric material is facilitated by mixing therewith a portion of ether taken as a sidestream from a point near the top of the heads column via line 54. Bottoms from the alcohol column consists substantially of water and are withdrawn through line 58 for use as process water in the crude alcohol production section, for example, to scrub the gas emerging from absorber 1 and to dilute the extract entering generator 12, or to supply heat to preheater 43. Any excess water is sent to the sewer.

From the description of the invention as outlined, numerous modifications will be apparent to those skilled in the art without departing from the spirit of this invention. Having fully described the invention, what is claimed by Letters Patent is:

1. A process for the preparation of refined isopropyl alcohol which comprises contacting a propylene-rich hydrocarbon with sulfuric acid of approximately 70% concentration in an absorption zone, whereby an extract liquor is formed, recovering unreacted vent gases from the absorption zone, withdrawing a portion of the extract from the absorption zone, passing the withdrawn extract through an external cooling zone, returning the cooled extract to the absorption zone to control the temperature therein, scrubbing the unreacted gases with water to recover isopropyl alcohol and sulfuric acid therefrom, passing the extract from the absorption zone to a hydrolysis-stripping zone, diluting the extract in the hydrolysis-stripping zone to a sulfuric acid concentration of approximately 40–50% by means of water recovered from the scrubbing of vent gases whereby dilute isopropyl alcohol is formed, passing the 40–50% acid to a reconcentration zone, reboiling the acid to approximately 70% strength with the accompanying production of steam, stripping the alcohol from the diluted extract by means of the steam so obtained, recovering crude isopropyl alcohol vapors overhead from the stripping-hydrolysis zone, washing the alcohol vapors successively with dilute aqueous caustic and with water in a scrubbing zone, condensing the crude isopropyl alcohol vapors, passing the crude isopropyl alcohol to a heads column, steam distilling the crude alcohol in the heads column to remove overhead low-boiling water-insoluble impurities, particularly isopropyl ether therefrom, condensing the overhead, washing the overhead with water and returning a portion of the wash water to the heads column as reflux, removing aqueous isopropyl alcohol free of water-insoluble impurities to a concentration zone, concentrating the isopropyl alcohol to approximately 91 volume per cent, and stripping the low-boiling water-soluble impurities, particularly acetone, from the concentrated isopropyl alcohol.

2. A process for the production of crude isopropyl alcohol which comprises contacting a propylene-rich hydrocarbon which is substantially free of higher boiling olefins with sulfuric acid of approximately 70% concentration in an absorption zone, whereby an extract liquor is formed, recovering unreacted vent gases from the absorption zone, withdrawing a portion of the extract from the absorption zone, passing the withdrawn extract through an external cooling zone, returning the cooled extract to the absorption zone to control the temperature therein, scrubbing the unreacted gases with water to recover isopropyl alcohol and sulfuric acid therefrom, passing the extract from the absorption zone to a hydrolysis-stripping zone, diluting the extract in the hydrolysis-stripping zone to a sulfuric acid concentration of approximately 40–50% by means of water recovered from the scrubbing of vent gases whereby dilute isopropyl alcohol is formed, passing the 40–50% acid to a reconcentration zone, reboiling the acid to approximately 70% strength with the accompanying production of steam, stripping the alcohol from the diluted extract by means of the steam so obtained, recovering crude isopropyl alcohol vapors overhead from the stripping-hydrolysis zone, washing the alcohol vapors successively with dilute aqueous caustic and with water in a scrubbing zone, and condensing the crude isopropyl alcohol vapors.

3. An improved process for the preparation of crude isopropyl alcohol which comprises contacting a propylene-rich hydrocarbon which is essentially free of higher olefins with sulfuric acid of approximately 70% concentration in an absorption zone whereby an extract liquor is formed, recovering unreacted vent gases from the absorption zone, scrubbing the unreacted vent gases with water to recover sulfuric acid and isopropyl alcohol therefrom, withdrawing the extract liquor from the absorption zone and diluting the extract liquor with the water recovered from the scrubbing of the vent gases whereby dilute isopropyl alcohol is formed.

4. A process for purifying crude aqueous isopropyl alcohol containing water-soluble impurities, particularly acetone, and water-insoluble impurities, particularly isopropyl ether, which comprises steam distilling the water-insoluble impurities from the crude alcohol in a distillation zone, condensing the water-insoluble impurities, washing the condensed impurities in the liquid phase with water, refluxing the wash water to the distillation zone, removing the crude aqueous alcohol free of water-insoluble impurities to a concentration zone, concentrating the alcohol by distillation in the concentration zone, recovering and condensing concentrated alcohol from the concentration zone, and stripping the water-soluble impurities, particularly acetone, from the concentrated isopropyl alcohol in a stripping zone.

BROOK I. SMITH.

REFERENCES CITED

The following references are of record in the file of this patent:

UNITED STATES PATENTS

| Number | Name | Date |
|---|---|---|
| 1,486,646 | Ellis et al. | Mar. 11, 1924 |
| 1,695,249 | Curme et al. | Dec. 11, 1928 |
| 1,859,241 | Merley et al. | May 17, 1932 |
| 1,919,618 | Brooks | July 25, 1933 |
| 2,061,810 | Shiffler et al. | Nov. 24, 1936 |
| 2,081,166 | Brooks | May 25, 1937 |
| 2,130,669 | Lewis | Sept. 20, 1938 |
| 2,313,196 | Guinot | Mar. 9, 1943 |